US012562975B1

(12) United States Patent
Graham Schomp et al.

(10) Patent No.: US 12,562,975 B1
(45) Date of Patent: Feb. 24, 2026

(54) CONFIDENCE-BASED GEOLOCATION OF NETWORK HOPS FROM AGGREGATED MULTI-SOURCE DATA

(71) Applicant: Cisco Technology, Inc., San Jose, CA (US)

(72) Inventors: Kyle Graham Schomp, Avon, OH (US); Arash Molavi Kakhki, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/811,082

(22) Filed: Aug. 21, 2024

(51) Int. Cl.
H04L 45/122 (2022.01)
H04L 45/121 (2022.01)

(52) U.S. Cl.
CPC .......... H04L 45/122 (2013.01); H04L 45/121 (2013.01)

(58) Field of Classification Search
CPC ........................... H04L 45/122; H04L 45/121
See application file for complete search history.

(56) References Cited

U.S. PATENT DOCUMENTS

| | | |
|---|---|---|
| 2009/0144411 A1 | 6/2009 | Winkler et al. |
| 2011/0282988 A1 | 11/2011 | Wang et al. |
| 2013/0007256 A1* | 1/2013 | Prieditis .................. H04L 41/12 709/224 |
| 2015/0072714 A1 | 3/2015 | Froehlich et al. |
| 2022/0110089 A1 | 4/2022 | Fan et al. |
| 2022/0279050 A1 | 9/2022 | Zmijewski et al. |

OTHER PUBLICATIONS

Dan O., et al., "IP Geolocation through Reverse DNS", ACM Transactions on Internet Technology, Oct. 2021, vol. 22, No. 1, Article 17, 29 Pages.
IPINFO: "The Trusted Source for IP Address Data", Trusted IP Data Provider, from IPV6 to IPv4, Retrieved from https://ipinfo.io/ on May 24, 2024, pp. 1-7.
Katz-Bassett E., et al., "Towards IP Geolocation Using Delay and Topology Measurements", IMC '06, Proceedings of the 6th ACM SIGCOMM Conference on Internet Measurement, Oct. 25-27, 2006, 13 Pages.
Kline E., et al., "RFC 8805 A Format for Self-Published IP Geolocation Feeds", Independent Submission, Aug. 2020, pp. 1-23.
MAXMIND: "Create Smarter, Safer Digital Experiences with Accurate Data", Industry leading IP Geolocation and Online Fraud Prevention, Retrieved from https://www.maxmind.com/en/home on May 24, 2024, pp. 1-6.

* cited by examiner

*Primary Examiner* — Benjamin M Thieu
(74) *Attorney, Agent, or Firm* — Merchant & Gould P.C.

(57) ABSTRACT

In one implementation, a device may obtain geolocation data from a plurality of sources for each hop in a traceroute. The device may assign a confidence characterization to each geolocation data point based on an accuracy assessment associated with its respective source. The device may identify a potential geolocation assignment for each hop in the traceroute based on the confidence characterization assigned to each geolocation data point and geolocations of neighboring hops in the traceroute. The device may validate the potential geolocation assignment for each hop based on a comparison of communication delays between hops in the traceroute to a physical constraint. The device may assign a validated potential geolocation assignment to each hop in the traceroute.

20 Claims, 8 Drawing Sheets

Device 200

Memory 240

Functional Process 246

Geolocation Process 248

Operating System 242

Data Structures 245

Bus 250

Processor(s) 220

Network Interface(s) 210

Input/Output Interface(s) 230

Power Supply 260

504

|   | A | B | C | D | E | F | G | H | I | J | K | T |
|---|---|---|---|---|---|---|---|---|---|---|---|---|
| A |   |   |   |   |   |   |   |   |   |   |   |   |
| B | 5 |   |   |   |   |   |   |   |   |   |   |   |
| C | 7 | 2 |   |   |   |   |   |   |   |   |   |   |
| D | 14 | 9 | 7 |   |   |   |   |   |   |   |   |   |
| E | ≤30 | ≤25 | ≤23 | ≤16 |   |   |   |   |   |   |   |   |
| F | 30 | 25 | 23 | 16 | ≤16 |   |   |   |   |   |   |   |
| G | ≤18 | ≤13 | ≤11 | - | - | - |   |   |   |   |   |   |
| H | ≤18 | ≤13 | ≤11 | - | - | - | ≤11 |   |   |   |   |   |
| I | ≤18 | ≤13 | ≤11 | - | - | - | ≤11 | ≤11 |   |   |   |   |
| J | 20 | 15 | 13 | 21 | ≤21 | 5 | ≤13 | ≤13 | 2 |   |   |   |
| K | ≤33 | ≤28 | ≤26 | 31 | ≤31 | 15 | ≤26 | ≤26 | ≤15 | 5 |   |   |
| T | 33 | 28 | 26 | 31 | ≤31 | 15 | ≤26 | ≤26 | ≤15 | 10 | 0 |   |

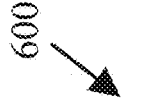

600

605 Start 610 obtain geolocation data from a plurality of sources for each hop in a traceroute 615 assign a confidence characterization to each geolocation data point based on an accuracy assessment associated with its respective source 620 identify a potential geolocation assignment for each hop based on the confidence characterization and geolocations of neighboring hops in the traceroute 625 validate the potential geolocation assignment for each hop based on a comparison of communication delays between hops in the traceroute to a physical constraint 630 assign a validated potential geolocation assignment to each hop in the traceroute 635 End

FIG. 6

CONFIDENCE-BASED GEOLOCATION OF NETWORK HOPS FROM AGGREGATED MULTI-SOURCE DATA

TECHNICAL FIELD

The present disclosure relates generally to computer networks and more particularly to confidence-based geolocation of network hops from aggregated multi-source data.

BACKGROUND

Internet protocol (IP) address geolocation involves determining the physical location of devices based on their IP addresses. This information can be leveraged for purposes of network management, security, and content delivery, among others. However, reliably and accurately determining an IP geolocation remains elusive due to a lack of definitive sources of geolocation information within computer networks.

Inaccurate geolocation information can also prevent or delay the resolution of network issues, negatively impacting performance and user experience. For instance, misidentified IP locations can lead to ineffective troubleshooting and prolonged downtime. In the case of content delivery, incorrect geolocation information could lead to suboptimal user experiences, as the selection of points of presence (PoPs) and content delivery networks (CDNs) to use by an endpoint is typically made based on its location (e.g., to select the closest one to it). Therefore, determining highly accurate geolocations, or at least the elimination of demonstrably wrong geolocations, is an essential evolution in realizing reliable network operations and end user satisfaction.

BRIEF DESCRIPTION OF THE DRAWINGS

The implementations herein may be better understood by referring to the following description in conjunction with the accompanying drawings in which like reference numerals indicate identically or functionally similar elements, of which:

FIG. 6 illustrates an example of a simplified procedure for confidence-based geolocation of network hops from aggregated multi-source data, in accordance with one or more implementations described herein.

DESCRIPTION OF EXAMPLE IMPLEMENTATIONS

Overview

According to one or more implementations of the disclosure, a device may obtain geolocation data from a plurality of sources for each hop in a traceroute. The device may assign a confidence characterization to each geolocation data point based on an accuracy assessment associated with its respective source. The device may identify a potential geolocation assignment for each hop in the traceroute based on the confidence characterization assigned to each geolocation data point and geolocations of neighboring hops in the traceroute. The device may validate the potential geolocation assignment for each hop based on a comparison of communication delays between hops in the traceroute to a physical constraint. The device may assign a validated potential geolocation assignment to each hop in the traceroute.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, and others. The Internet is an example of a WAN that connects disparate networks throughout the world, providing global communication between nodes on various networks. Other types of networks, such as field area networks (FANs), neighborhood area networks (NANs), personal area networks (PANs), enterprise networks, etc. may also make up the components of any given computer network. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Figure 1:
FIG. 1 illustrates an example computer network.
Figure 1:
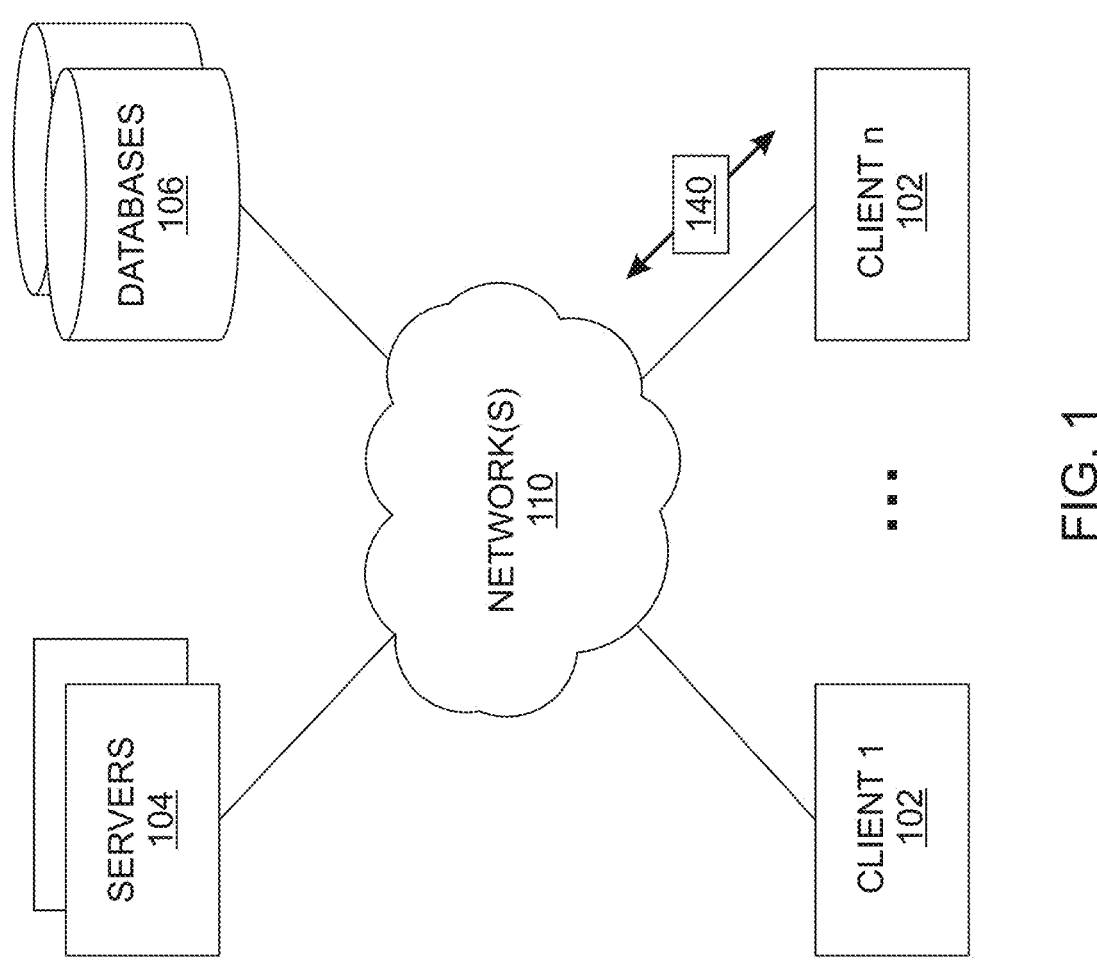

FIG. 1 is a schematic block diagram of an example simplified computing system (e.g., the computing system 100), which includes client devices 102 (e.g., a first through nth client device), one or more servers 104, and databases 106 (e.g., one or more databases), where the devices may be in communication with one another via any number of networks (e.g., network(s) 110). The network(s) 110 may include, as would be appreciated, any number of specialized networking devices such as routers, switches, access points, etc., interconnected via wired and/or wireless connections. For example, client devices 102, the one or more servers 104 and/or the intermediary devices in network(s) 110 may communicate wirelessly via links based on WiFi, cellular, infrared, radio, near-field communication, satellite, or the like. Other such connections may use hardwired links, e.g., Ethernet, fiber optic, etc. The nodes/devices typically communicate over the network by exchanging discrete frames or packets of data (packets 140) according to predefined protocols, such as the Transmission Control Protocol/Internet Protocol (TCP/IP) other suitable data structures, protocols, and/or signals. In this context, a protocol consists of a set of rules defining how the nodes interact with each other.

Client devices 102 may include any number of user devices or end point devices configured to interface with the techniques herein. For example, client devices 102 may include, but are not limited to, desktop computers, laptop computers, tablet devices, smart phones, wearable devices (e.g., heads up devices, smart watches, etc.), set-top devices, smart televisions, Internet of Things (IoT) devices, autonomous devices, or any other form of computing device capable of participating with other devices via network(s) 110.

Notably, in some implementations, the one or more servers 104 and/or databases 106, including any number of other suitable devices (e.g., firewalls, gateways, and so on) may be part of a cloud-based service. In such cases, the servers and/or databases 106 may represent the cloud-based device(s) that provide certain services described herein, and may be distributed, localized (e.g., on the premise of an enterprise, or "on prem"), or any combination of suitable configurations, as will be understood in the art.

Those skilled in the art will also understand that any number of nodes, devices, links, etc. may be used in computing system 100, and that the view shown herein is for simplicity. Also, those skilled in the art will further understand that while the network is shown in a certain orientation, the computing system 100 is merely an example illustration that is not meant to limit the disclosure.

Notably, web services can be used to provide communications between electronic and/or computing devices over a network, such as the Internet. A web site is an example of a type of web service. A web site is typically a set of related web pages that can be served from a web domain. A web site can be hosted on a web server. A publicly accessible web site can generally be accessed via a network, such as the Internet. The publicly accessible collection of web sites is generally referred to as the World Wide Web (WWW).

Also, cloud computing generally refers to the use of computing resources (e.g., hardware and software) that are delivered as a service over a network (e.g., typically, the Internet). Cloud computing includes using remote services to provide a user's data, software, and computation.

Moreover, distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a Software as a Service (SaaS) over a network, such as the Internet.

Figure 2:
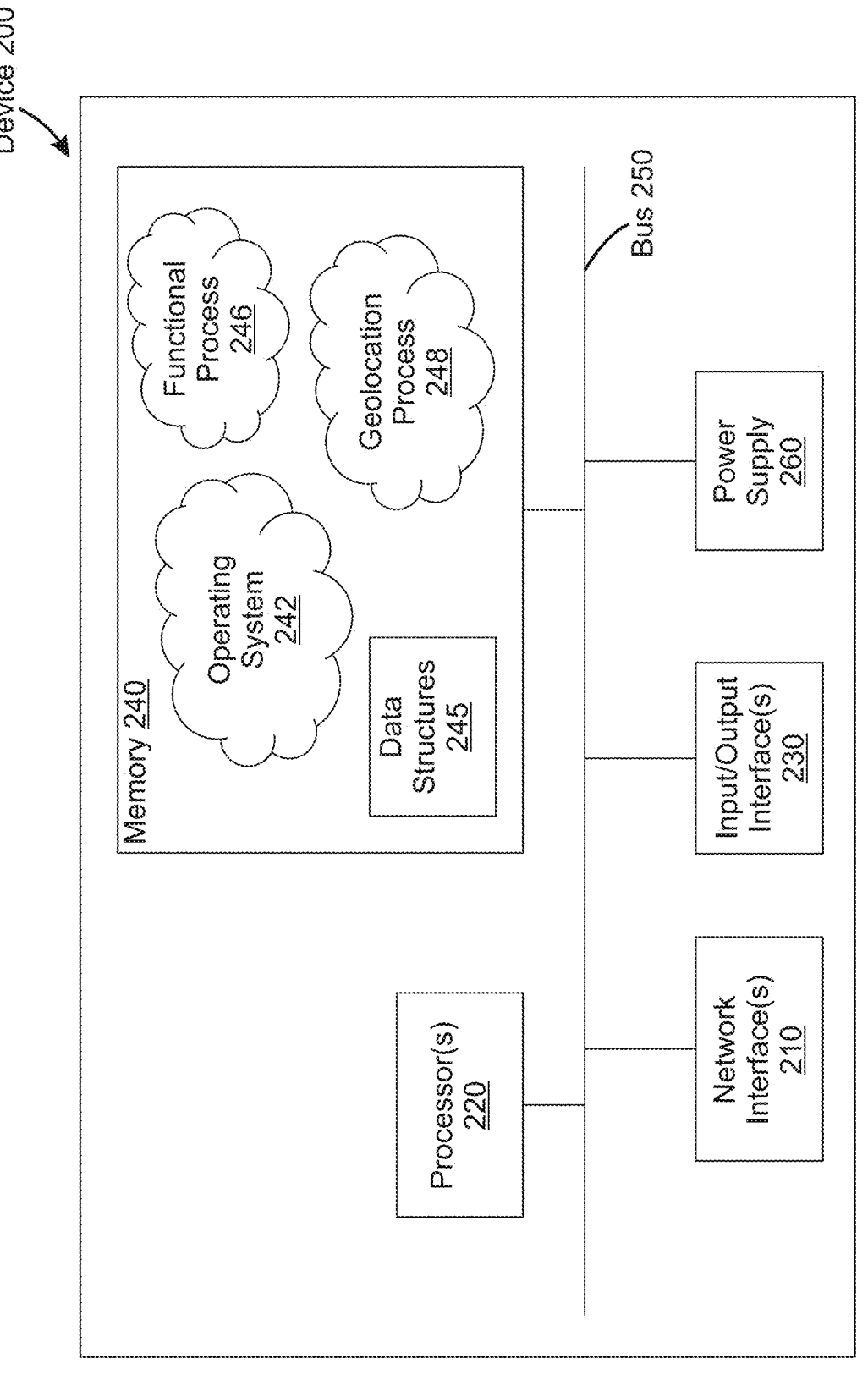
FIG. 2 illustrates an example computing device/node.

FIG. 2 is a schematic block diagram of an example node/device 200 (e.g., an apparatus) that may be used with one or more implementations described herein, e.g., as any of the devices shown in FIG. 1 above. Device 200 may comprise one or more network interfaces, such as interfaces 210 (e.g., wired, wireless, network interfaces, etc.), at least one processor (e.g., processor 220), and a memory 240 interconnected by a system bus 250, as well as a power supply 260 (e.g., battery, plug-in, etc.).

The interfaces 210 contain the mechanical, electrical, and signaling circuitry for communicating data over links coupled to the network(s) 110. The network interfaces may be configured to transmit and/or receive data using a variety of different communication protocols. Note, further, that device 200 may have multiple types of network connections via interfaces 210, e.g., wireless and wired/physical connections, and that the view herein is merely for illustration.

Depending on the type of device, other interfaces, such as input/output (I/O) interfaces 230, user interfaces (UIs), and so on, may also be present on the device. Input devices, in particular, may include an alpha-numeric keypad (e.g., a keyboard) for inputting alpha-numeric and other information, a pointing device (e.g., a mouse, a trackball, stylus, or cursor direction keys), a touchscreen, a microphone, a camera, and so on. Additionally, output devices may include speakers, printers, particular network interfaces, monitors, etc.

The memory 240 comprises a plurality of storage locations that are addressable by the processor 220 and the interfaces 210 for storing software programs and data structures associated with the implementations described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise a one or more functional processes (e.g., functional processes 246), and on certain devices, an illustrative process such as geolocation process 248, as described herein. Notably, functional processes 246, when executed by processor 220, cause each device 200 to perform the various functions corresponding to the particular device's purpose and general configuration. For example, a router would be configured to operate as a router, a server would be configured to operate as a server, an access point (or gateway) would be configured to operate as an access point (or gateway), a client device would be configured to operate as a client device, and so on.

It will be apparent to those skilled in the art that other processor and memory types, including various computer-readable media, may be used to store and execute program instructions pertaining to the techniques described herein. Also, while the description illustrates various processes, it is expressly contemplated that various processes may be implemented as modules configured to operate in accordance with the techniques herein (e.g., according to the functionality of a similar process). Further, while processes may be shown and/or described separately, those skilled in the art will appreciate that processes may be routines or modules within other processes.

In various implementations, as detailed further below, geolocation process 248 may include computer executable instructions that, when executed by processor 220, cause device 200 to perform the techniques described herein. To do so, in some implementations, geolocation process 248 may utilize and/or be a component of machine learning implementations. In general, machine learning is concerned with the design and the development of techniques that take as input empirical data (such as network statistics and performance indicators) and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a, b, c such that the number of misclassified points is minimal. After this optimization phase (or learning phase), the model M can be used very easily to classify new data points. Often, M is a statistical model, and the cost function is inversely proportional to the likelihood of M, given the input data.

In various implementations, geolocation process 248 may employ and/or be utilized to handle prompts to and/or access of one or more supervised, unsupervised, or semi-supervised machine learning models trained to aggregate geolocations for network nodes across multiple data sources, determine a confidence associated with a geolocation, adjust delays, determine delays between nodes, bucketize traces, iterate buckets, merge per node buckets, assign colocation to buckets that do not have colocation, assign bucket location to all nodes in a bucket, perform location consistency between traces, etc.

Generally, supervised learning entails the use of a training set of data that is used to train the model to apply labels to the input data. For example, the training data may include sample configurations labeled with textual metadata. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that geolocation process 248 can employ and/or be utilized in concert with may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), generative adversarial networks (GANs), long short-term memory (LSTM), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for timeseries), random forest classification, or the like.

In further implementations, geolocation process 248 may also include, or otherwise use or be employed to operate with, one or more generative artificial intelligence/machine learning models. In contrast to discriminative models that simply seek to perform pattern matching for purposes such as anomaly detection, classification, or the like, generative approaches instead seek to generate new content or other data (e.g., audio, video/images, text, etc.), based on an existing body of training data. For instance, in the context of configuring an observability platform to perform certain application analytics, geolocation process 248 may be a component of, use, and/or be utilized in the management of prompts/access to a generative model to perform network mapping, generate configurations, analyses, root cause analysis, or other outputs based on a conversational input from a user (e.g., voice, text, etc.). In another example, geolocation process 248 may utilize a generative model with a method invocation data collector (MIDC) to assist in automated or manual identification of transactional attributes for spans. In yet another example, geolocation process 248 may be utilize a generative model to aggregate geolocations for network nodes across multiple data sources, determine a confidence associated with a geolocation, adjust delays, determine delays between nodes, bucketize traces, iterate buckets, merge per node buckets, assign colocation to buckets that do not have colocation, assign bucket location to all nodes in a bucket, perform location consistency between traces, etc. Example generative approaches can include, but are not limited to, generative adversarial networks (GANs), large language models (LLMs), other transformer models, and the like.

The performance of a machine learning model can be evaluated in a number of ways based on the number of true positives, false positives, true negatives, and/or false negatives of the model. For example, consider the case of a model that predicts whether the QoS of a path will satisfy the service level agreement (SLA) of the traffic on that path. In such a case, the false positives of the model may refer to the number of times the model incorrectly predicted that the QoS of a particular network path will not satisfy the SLA of the traffic on that path. Conversely, the false negatives of the model may refer to the number of times the model incorrectly predicted that the QoS of the path would be acceptable. True negatives and positives may refer to the number of times the model correctly predicted acceptable path performance or an SLA violation, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

Figure 3:
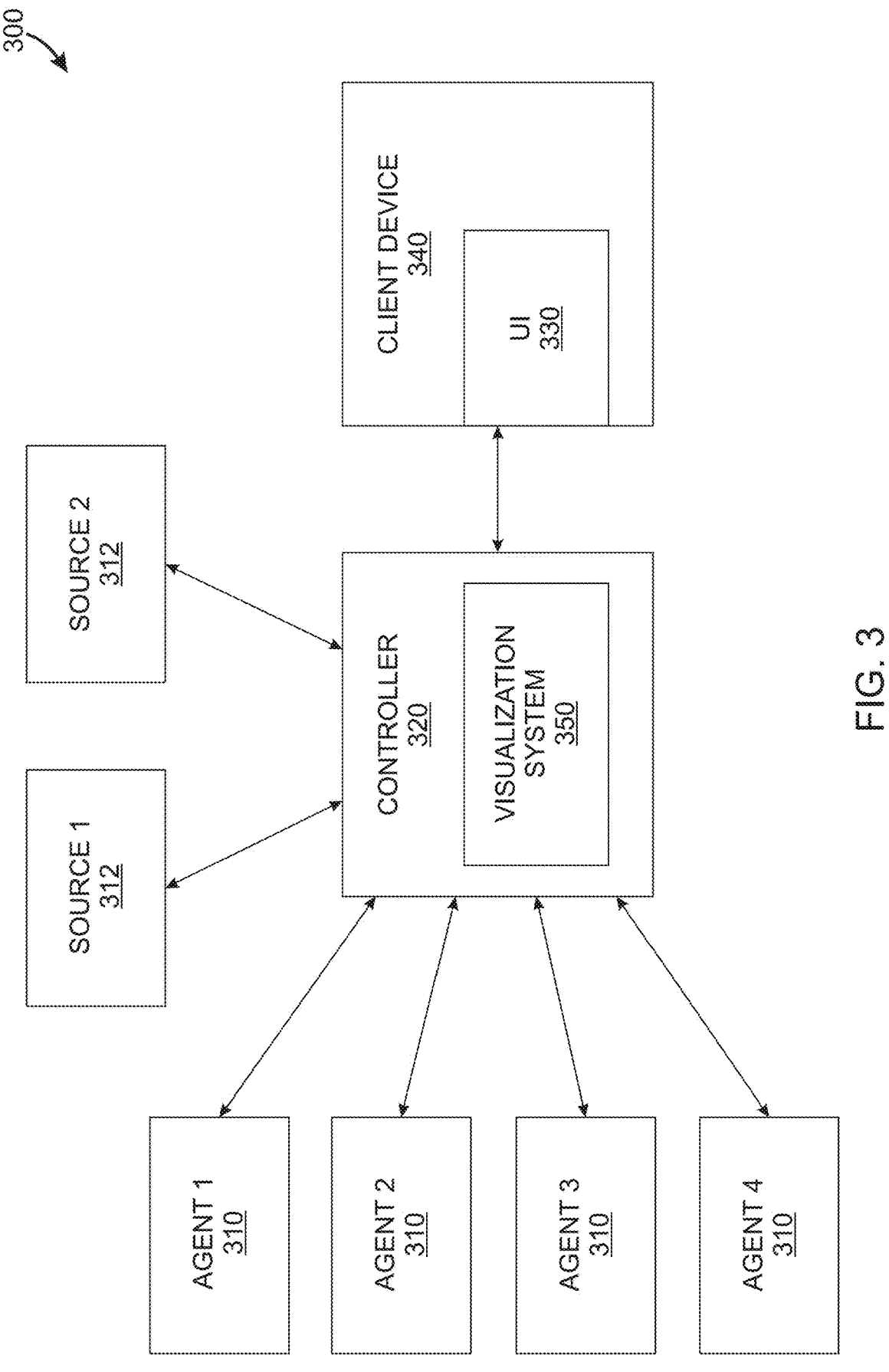
FIG. 3 illustrates an example observability intelligence platform.

FIG. 3 is a block diagram of an example of an observability intelligence platform 300 that can implement one or more aspects of the techniques herein. The observability intelligence platform 300 is a system that monitors and collects metrics of performance data for a network and/or application environment being monitored. At the simplest structure, the observability intelligence platform 300 includes one or more agents (e.g., agents 310), one or more sources (e.g., sources 312), and one or more servers/controllers (e.g., controller 320). Agents may be installed on network browsers, devices, servers, etc., and may be executed to monitor the associated device and/or application, the operating system of a client, and any other application, API, or another component of the associated device and/or application, and to communicate with (e.g., report data and/or metrics to) the controller 320 as directed. Note that while FIG. 3 shows four agents (e.g., Agent 1 through Agent 4) communicatively linked to a single controller, the total number of agents and controllers can vary based on a number of factors including the number of networks and/or applications monitored, how distributed the network and/or application environment is, the level of monitoring desired, the type of monitoring desired, the level of user experience desired, and so on.

For example, instrumenting an application with agents may allow a controller to monitor performance of the application to determine such things as device metrics (e.g., type, configuration, resource utilization, etc.), network browser navigation timing metrics, browser cookies, application calls and associated pathways and delays, other aspects of code execution, etc. Moreover, if a customer uses agents to run tests, probe packets may be configured to be sent from agents to travel through the Internet, go through many different networks, and so on, such that the monitoring solution gathers all of the associated data (e.g., from returned packets, responses, and so on, or, particularly, a lack thereof). Illustratively, different "active" tests may comprise HTTP tests (e.g., using curl to connect to a server and load the main document served at the target), Page Load tests (e.g., using a browser to load a full page—i.e., the main document along with all other components that are included in the page), or Transaction tests (e.g., same as a Page Load, but also performing multiple tasks/steps within the page— e.g., load a shopping website, log in, search for an item, add it to the shopping cart, etc.).

The controller 320 is the central processing and administration server for the observability intelligence platform 300. The controller 320 may serve a user interface 330 (denoted UI in FIG. 3), such as a browser-based UI, that is the primary interface for monitoring, analyzing, and trouble-shooting the monitored environment. Specifically, the controller 320 can receive data from agents 310, sources 312 (and/or other coordinator devices), associate portions of data (e.g., topology, transaction end-to-end paths and/or metrics, etc.), communicate with agents to configure collection of the data (e.g., the instrumentation/tests to execute), and provide performance data and reporting through user interface 330. User interface 330 may be viewed as a web-based interface viewable by a client device 340. In some implementations, a client device 340 can directly communicate with controller 320 to view an interface for monitoring data. The controller 320 can include a visualization system 350 for displaying the reports and dashboards related to the disclosed technology. In some implementations, the visualization system 350 can be implemented in a separate machine (e.g., a server) different from the one hosting the controller 320.

Notably, in an illustrative Software as a Service (SaaS) implementation, an instance of controller 320 may be hosted remotely by a provider of the observability intelligence platform 300. In an illustrative on-premises (On-Prem) implementation, a controller 320 may be installed locally and self-administered.

The controllers 320 receive data from the agents 310 (e.g., Agents 1-4) and/or sources 312 deployed to monitor networks, applications, databases and database servers, servers, and end user clients for the monitored environment. Any of the agents 310 can be implemented as different types of agents with specific monitoring duties. For example, application agents may be installed on each server that hosts applications to be monitored. Instrumenting an agent adds an application agent into the runtime process of the application. Further, the controllers 320 can receive data from sources 312 (e.g., sources 1-2). Any of the sources can be implemented to provide various types of observability data that can include information, metrics, telemetry data, business data, network data, etc.

Database agents, for example, may be software (e.g., a Java program) installed on a machine that has network access to the monitored databases and the controller. Stand-alone machine agents, on the other hand, may be standalone programs (e.g., standalone Java programs) that collect hard-ware-related performance statistics from the servers (or other suitable devices) in the monitored environment. The standalone machine agents can be deployed on machines that host application servers, database servers, messaging servers, Web servers, etc. Furthermore, end user monitoring (EUM) may be performed using browser agents and mobile agents to provide performance information from the point of view of the client, such as a web browser or a mobile native application. Through EUM, web use, mobile use, or com-binations thereof (e.g., by real users or synthetic agents) can be monitored based on the monitoring needs.

Note that monitoring through browser agents and mobile agents are generally unlike monitoring through application agents, database agents, and standalone machine agents that are on the server. In particular, browser agents may generally be implemented as small files using web-based technologies, such as JavaScript agents injected into each instrumented web page (e.g., as close to the top as possible) as the web page is served and are configured to collect data. Once the web page has completed loading, the collected data may be bundled into a beacon and sent to an EUM process/cloud for processing and made ready for retrieval by the controller. Browser real user monitoring (Browser RUM) provides insights into the performance of a web application from the point of view of a real or synthetic end user. For example, Browser RUM can determine how specific Ajax or iframe calls are slowing down page load time and how server performance impact end user experience in aggregate or in individual cases. A mobile agent, on the other hand, may be a small piece of highly performant code that gets added to the source of the mobile application. Mobile RUM provides information on the native mobile application (e.g., iOS or Android applications) as the end users actually use the mobile application. Mobile RUM provides visibility into the functioning of the mobile application itself and the mobile application's interaction with the network used and any server-side applications with which the mobile application communicates.

Note further that in certain implementations, in the application intelligence model, a transaction represents a particu-lar service provided by the monitored environment. For example, in an e-commerce application, particular real-world services can include a user logging in, searching for items, or adding items to the cart. In a content portal, particular real-world services can include user requests for content such as sports, business, or entertainment news. In a stock trading application, particular real-world services can include operations such as receiving a stock quote, buying, or selling stocks.

An application transaction, in particular, is a representa-tion of the particular service provided by the monitored environment that provides a view on performance data in the context of the various tiers that participate in processing a particular request. That is, an application transaction, which may be identified by a unique application transaction iden-tification (ID), represents the end-to-end processing path used to fulfill a service request in the monitored environment (e.g., adding items to a shopping cart, storing information in a database, purchasing an item online, etc.). Thus, an appli-cation transaction is a type of user-initiated action in the monitored environment defined by an entry point and a processing path across application servers, databases, and potentially many other infrastructure components. Each instance of an application transaction is an execution of that transaction in response to a particular user request (e.g., a socket call, illustratively associated with the TCP layer). An application transaction can be created by detecting incoming requests at an entry point and tracking the activity associated with request at the originating tier and across distributed components in the application environment (e.g., associating the application transaction with a 4-tuple of a source IP address, source port, destination IP address, and destination port). A flow map can be generated for an application transaction that shows the touch points for the application transaction in the application environment. In one imple-mentation, a specific tag may be added to packets by application specific agents for identifying application trans-actions (e.g., a custom header field attached to a hypertext transfer protocol (HTTP) payload by an application agent, or by a network agent when an application makes a remote socket call), such that packets can be examined by network agents to identify the application transaction identifier (ID) (e.g., a Globally Unique Identifier (GUID) or Universally Unique Identifier (UUID)). Performance monitoring can be oriented by application transaction to focus on the perfor-mance of the services in the application environment from the perspective of end users. Performance monitoring based on application transactions can provide information on whether a service is available (e.g., users can log in, check out, or view their data), response times for users, and the cause of problems when the problems occur.

In accordance with certain implementations, both self-learned baselines and configurable thresholds may be used to help identify network and/or application issues. A complex distributed application, for example, has a large number of performance metrics and each metric is important in one or more contexts. In such environments, it is difficult to determine the values or ranges that are normal for a particular metric; set meaningful thresholds on which to base and receive relevant alerts; and determine what is a "normal" metric when the application or infrastructure undergoes change. For these reasons, the disclosed observability intelligence platform can perform anomaly detection based on dynamic baselines or thresholds, such as through various machine learning techniques, as may be appreciated by those skilled in the art. For example, the illustrative observability intelligence platform herein may automatically calculate dynamic baselines for the monitored metrics, defining what is "normal" for each metric based on actual usage. The observability intelligence platform may then use these baselines to identify subsequent metrics whose values fall out of this normal range.

In general, data/metrics collected relate to the topology and/or overall performance of the network and/or application (or application transaction) or associated infrastructure, such as, e.g., load, average response time, error rate, percentage CPU busy, percentage of memory used, etc. The controller UI can thus be used to view all of the data/metrics that the agents report to the controller, as topologies, heatmaps, graphs, lists, and so on. Illustratively, data/metrics can be accessed programmatically using a Representational State Transfer (REST) API (e.g., that returns either the JavaScript Object Notation (JSON) or the extensible Markup Language (XML) format). Also, the REST API can be used to query and manipulate the overall observability environment.

Those skilled in the art will appreciate that other configurations of observability intelligence may be used in accordance with certain aspects of the techniques herein, and that other types of agents, instrumentations, tests, controllers, and so on may be used to collect data and/or metrics of the network(s) and/or application(s) herein. Also, while the description illustrates certain configurations, communication links, network devices, and so on, it is expressly contemplated that various processes may be implemented across multiple devices, on different devices, utilizing additional devices, and so on, and the views shown herein are merely simplified examples that are not meant to be limiting to the scope of the present disclosure.

As noted above, geolocating IP addresses is a challenging problem because there is no definitive source of geolocation information in computer networks. As a result, there are many attempts to infer geolocation using a variety of metrics. The current state is that many different solutions exist, each producing geolocations with unknown error, and conflicting answers with each other. Incorrect geolocation information can delay work to resolve networking issues, impacting performance and user experience.

—Confidence-Based Geolocation of Network Hops from Aggregated Multi-source Data—

In contrast, the techniques described herein introduce a mechanism that provides higher accuracy geolocation of the hops in path traces by using multiple sources of geolocation information and an ensemble approach to pick locations with the highest confidence. Then, the geolocations may be refined by excluding the lower confidence geolocations through physical constraint validation (e.g., exclude those that violate speed of light physics, etc.).

Illustratively, the techniques described herein may be performed by hardware, software, and/or firmware, such as in accordance with geolocation process 248, which may include computer executable instructions executed by the processor 220 (or independent processor of interfaces 210) to perform functions relating to the techniques described herein.

Specifically, according to various implementations, a device may a device may a device may obtain geolocation data from a plurality of sources for each hop in a traceroute. The device may assign a confidence characterization to each geolocation data point based on an accuracy assessment associated with its respective source. The device may identify a potential geolocation assignment for each hop in the traceroute based on the confidence characterization assigned to each geolocation data point and geolocations of neighboring hops in the traceroute. The device may validate the potential geolocation assignment for each hop based on a comparison of communication delays between hops in the traceroute to a physical constraint. The device may assign a validated potential geolocation assignment to each hop in the traceroute.

Figure 4:
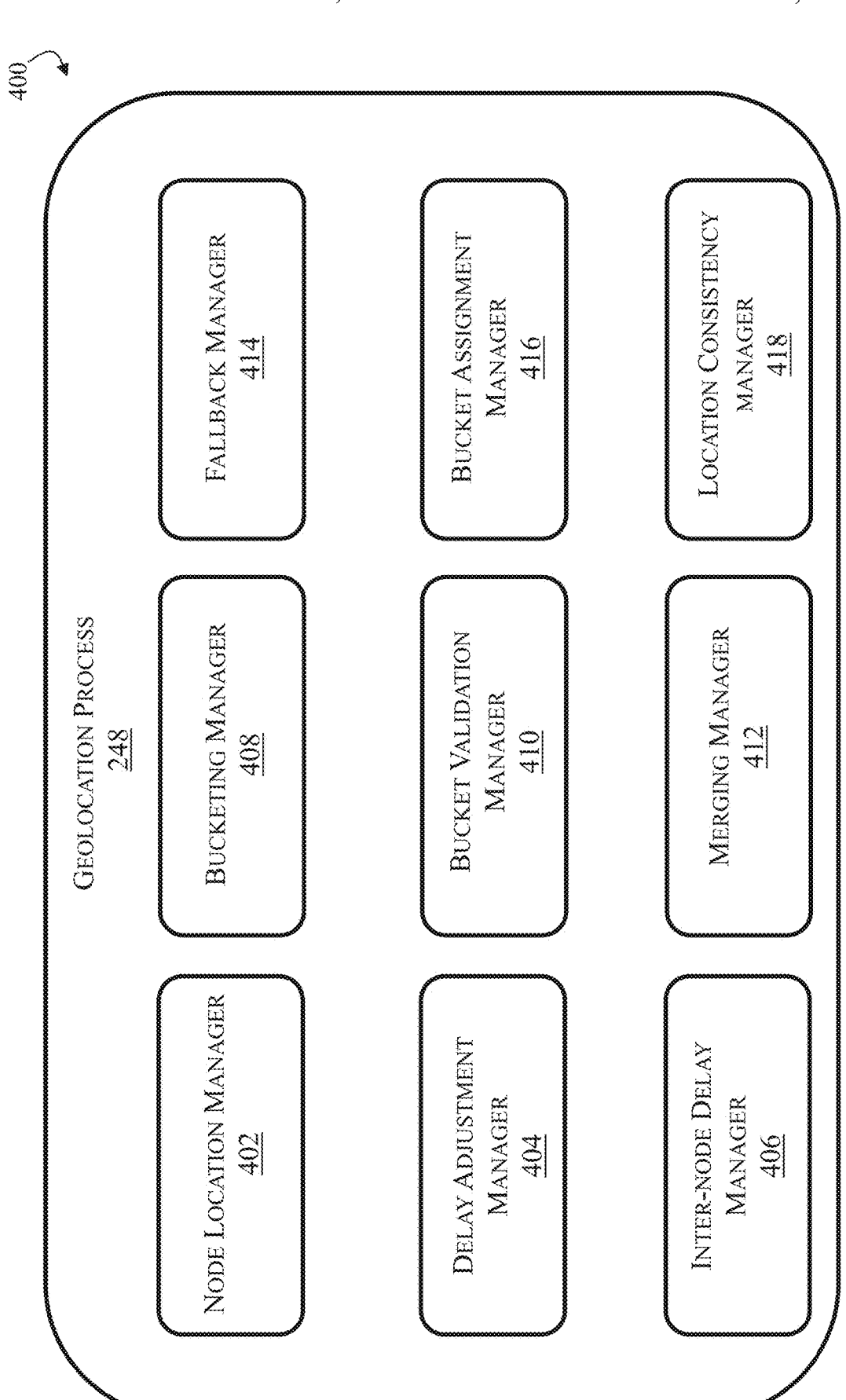
FIG. 4 illustrates an example of an architecture for implementing confidence-based geolocation of network hops from aggregated multi-source data.

Operationally, FIG. 4 illustrates an example of an architecture 400 for implementing confidence-based geolocation of network hops from aggregated multi-source data, in accordance with one or more implementations described herein. At the core of architecture 400 is geolocation process 248, which may be executed (wholly or partially) by a controller for a network or another device in communication therewith. For instance, geolocation process 248 may be executed by a controller for a network, a particular networking device in the network (e.g., a router, a firewall, etc.), a server, another device or service in communication therewith, or the like. All or some of the geolocation process 248 may be executed as a component of and/or in coordination with an observability intelligence platform (e.g., observability intelligence platform 300). Furthermore, all or some of geolocation process 248 may be executed as a component of and/or in coordination with a machine learning model (e.g., generating inputs for, utilizing outputs of, etc.).

As shown, geolocation process 248 may include any or all of the following components: node location manager 402, delay adjustment manager 404, inter-node delay manager 406, bucketing manager 408, bucket validation manager 410, merging manager 412, fallback manager 414, and/or location consistency manager 418. As would be appreciated, the functionalities of these components may be combined or omitted, as desired. In addition, these components may be implemented on a singular device or in a distributed manner, in which case the combination of executing devices can be viewed as their own singular device for purposes of executing geolocation process 248.

Generally, geolocation process 248 may provide higher accuracy geolocation of the hops in path traces by collecting all available geolocations from other sources. For example, the geolocation of the IP address for each hop in a traceroute may be collected from N different geolocation sources. The geolocation sources may include sources such as a reverse domain name service (rDNS), a Google API, an HTML5 Geolocation, Maxmind, link delays (for location correction), PeeringDB, RIPE IPmap, cloud provider feeds, and various other sources. Then a confidence (e.g., characterization, score, classification, etc.) may be assigned to each geolocation based upon the available accuracy data for the source and/or expert knowledge.

Next, geolocation process 248 may fill in geolocations for hops that do not have any geolocations from any available source as follows. If there are other hops very near to the hop (e.g., configuration 5 ms RTT threshold), then it may be concluded that the hops are highly likely in the same general area and the geolocation of the other hop may be extended to this hop. This approach may facilitate the accurate geolocation of anycast IP addresses to different geolocations in different traceroutes.

Then, geolocation process 248 may resolve discrepancies between sources in the following way. For each hop, a preferred geolocation may be assigned as the geolocation with the highest aggregate confidence across all sources. The preferred geolocations of each hop may be iteratively compared to the preferred geolocations of the hop before and after it in the traceroute. If there is a conflict due to physical limitation violations (e.g., speed of light violations, etc.), it may be resolved by switching one or more of the hops' preferred geolocations to the next highest confidence geolocation available for that hop. This may be repeated until either there are no conflicts, or the hops have no more geolocations, thereby eliminating all of the demonstrably wrong geolocations.

For example, when executed, the node location manager 402 may perform initial node location and/or assessment operations. This may include gathering and evaluating geolocation data from various source for each hop in a traceroute. For example, given a collection of traces belonging to the same (testId, roundId, vAgentId) tuple, each node may have geolocations associated with it from multiple sources. Additionally, these operations may include assigning confidence characterizations based on a source's reliability. For example, each geolocation may be assigned a confidence score (e.g., ranging from 0.0 to 1.0 (except for the agent)). This may be utilized in weighing the accuracy of each geolocation datapoint. Confidence scores calculated for each geolocation source may be summed across sources per location to represent the supporting confidence provided by each source, per location.

When executed, the node location manager 402 may collect the geolocation data points. An agent location, if present, may always be trusted and considered erroneous to change. As such, the agent location may be assigned a very high confidence characterization (e.g., 1000) to prevent it from being overridden. The source of the agent location may either be configuration (e.g., in the case of CEA) or "AGENT" (e.g., HTML5 geolocation API) or "GOOGLE" (e.g., Google API).

Some agents may be assigned only a state or country level geolocation. Node location manager 402 may be configured to accommodate this variation and other across geolocation designations (e.g., normalize geolocation designations). Further, a MaxMind geolocation of an agent may be based upon the source IP address from the agent check-in.

In some instances, this may actually be the IP address of a VPN tunnel exit if the agent uses a VPN, and the check-in traverses the tunnel. As such, special care may be taken for the location of end point agents and enterprise agents. They may be behind VPNs, and thus the public IP address of the agent (e.g., used with MaxMind) may not be representative of the agent but of the VPN. When a VPN is detected, the geolocation of the public IP address may be assigned to the VPN node on the path.

It may not always be possible to detect the presence of a VPN, nor to know whether or not the check-in (e.g., from which we obtain the public IP address of the agent) traverses the VPN (e.g., in the case of a split VPN). In those circumstances, it may be safest to not use the public IP address of the check-in to geolocate the agent. However, this could significantly reduce the number of agents that can be geolocated at all. Therefore, in such instances, the MaxMind geolocation of the agent may be used instead, assuming that it is a good approximation of the agent's location.

In various implementations, the geolocation may be an rDNS geolocation. The confidence characterization assigned to the rDNA geolocation may be based upon the length of the code matched. In various implementations, it may be assumed that the codes used in rDNS can sometimes match multiple codes for different cities, longer code matches are typically more correct, and/or shorter codes can sometimes incorrectly match.

Thus, rDNS geolocation may be changed to match all regexes and weight each according to the length of the code matched. For instance, if the length of the code matched is one letter, then it may be assigned a confidence characterization of 0.0 (e.g., do not use); if the length of the code matched is two letters (e.g., "la"), then it may be assigned a confidence characterization of 0.5; if the length of the code matched is three letters (e.g., "san"), then it may be assigned a confidence characterization of 0.6; if the length of the code matched is three letters (e.g., "pitt"), then it may be assigned a confidence characterization of 0.7, etc.

The geolocation may be a MaxMind geolocation. Presently, MaxMind offers two metrics that may be leveraged to assign confidence in their geolocations. First, latitude/longitude values are returned with an accuracy_radius of the circle around the location where MaxMind considers the IP address to be located. This can be a discrete value in km from 5 to 1000. MaxMind also offers a confidence metric on the city/country returned, which may be leveraged as well. Often, MaxMind geolocations with accuracy_radius≤50 km are very consistent with rDNS, so those may be assigned increased confidence that they are correct. Very large radii may not support city level geolocation, so in those instances it may be only the country utilized with those. In various implementations, a MaxMind geolocation may be assigned a confidence characterization that is inverse to accuracy_radius of the geolocation. For example, if the accuracy_radius of the geolocation is ≤50 km, then it may be assigned a confidence characterization of 0.4; if the accuracy_radius of the geolocation is ≤500 km, then it may be assigned a confidence characterization of 0.1 (use country only); otherwise, it may be assigned a confidence characterization of 0.0 (do not use), etc.

At the country level, MaxMind has been found to be very consistent with rDNS. However, in some instances MaxMind utilizes the US as a catch-all country designation when it is uncertain about the location of major operators' address space. Thus, when ASN matches one identified and MaxMind returns the US, the confidence assigned to the geolocation may be reduced by half, with the expectation that other geolocation sources may overwrite it if wrong.

The geolocation may be a PeeringDB geolocation. The peeringDB location may be assigned a relatively high confidence (e.g., 1.0) geolocation of IP addresses in internet exchange points (IXPs). While these geolocations may be collected via repeated calls to the PeeringDB API, in various implementations part of or the whole databased may simply be downloaded and queried locally. In such instances, the database may be downloaded at regular intervals (e.g., daily, etc.).

For instance, fac, ixpfx, ixlan, ixfac, and/or fac objects downloaded from these databases may be utilized to geolocate IP addresses. For example, the ixpfx object may map IP prefixes to the IDs of ixlans, the ixlan object may map IDs of ixlans to IDs of ixs, the ixfac object may map IDs of ixs to IDs of facs, and the fac object may may IDs of facs to latitude/longitude. Together, these may be leveraged to provide a mapping from prefix to latitude/longitude. In some instances, it may actually give multiple mappings for the same prefix, as the IX may have facilities in multiple cities in a major metropolitan area. In such instances, an aggregation up to the metropolitan area may be substituted.

The geolocation may be a RIPE IPmap geolocation. RIPE IPmap may offer a high-confidence geolocation of a small set of IP addresses. This datasource has a confidence value built in, albeit with a different scale, that may be leveraged. The confidence value associated with the geolocation may shifted into the correct scale. This may be accomplished by an operation such as:

$$0.7 \times \frac{RIPE\ \text{confidence} - \min(RIPE\ \text{confidence})}{\max(RIPE\ \text{confidence}) - \min(RIPE\ \text{confidence})}$$

where the maximum confidence level is 0.7, higher than MaxMind and matching rDNS. This reflects a determination that RIPE IPmap may be considered to be higher confidence than MaxMind. Given that the RIPE confidence value range may vary between versions of the datasource, the shifted confidence characterization may be calculated from the values in the datasource, as outlined above.

If the IP address of the node is found in a cloud provider feed, this geolocation may also be added to the list of node locations. An assumption may be made that cloud provider feeds are very accurate, so the assigned confidence value may very high (e.g., 10000). If conflicts are found between cloud provider locations and other high confidence locations (e.g., PeeringDB, agent configuration, Google API, etc.) in subsequent operations of geolocation process 248, they may be logged for further investigations offline.

The node location manager 402 may aggregate by summing the scores for each location. Once complete, each node may then have an array of possible locations (although it is possibly empty). For the destination hop, geolocations from public databases (e.g., MaxMind, RIPE IPmap, etc.) may be wrong due to anycast. Therefore, node location manager 402 may, in some implementations, reduce the confidence in these sources by half for the destination hop.

Node location manager 402 may utilize location information from many different and every-expanding amounts of sources. As a result, there can be inconsistencies in the locations returned by the different sources. For example, some external databases may represent location names with localizations, while others use English names (e.g., Montréal vs. Montreal).

Node location manager 402 may be configured to normalize the localizations to remove discrepancies and/or avoid errors. For instance, the ISO 2-letter code standard may be utilized for countries. For cities, the latitude and longitude returned by the database may be converted into the nearest location from an internal database of geolocations.

Further, because of errors that may be introduced with anycast utilization, geolocation databases (e.g., MaxMind, RIPE IPmap, etc.) that provide anycast IP addresses may, in some instances, not be consulted for the destination IP. This is because, a geolocation for anycast IP addresses may potentially be correct from the vantage point of the databases, but it may be incorrect for the agent(s) running the traceroutes. This can produce misleading results and lead to incorrect geolocation of not only the destination but the rest of the trace.

When executed, the delay adjustment manager 404 may perform delay adjustment operations that determine propagation delays and perform assurance checks to ensure that the measured delays are consistent and realistic. This may ensure that delays reflect the actual distance between nodes, avoiding anomalies that can distort the geolocation process.

The delay adjustment operations may include finding the propagation delay from an agent to each hop. This may include selecting, for every IP (e.g., private, and public), the minimum delay seen among traces with the same path to the IP. Here, the same path may mean that the traces traverse the same hops identified by IP address from the agent to the current hop. Because the path is the same, the latencies to the hop may be considered as comparable. If the hop is reachable via more than one path, then there is potentially more than one latency from the origin of the trace to the hop.

Additionally, the delay adjustment operations may include enforcing monotonically increasing delays. This may include, for each trace, identifying delays that are not monotonically increasing starting from the last hop. Each trace may utilize the same five tuple when performing traceroute, significantly decreasing the chance that packets traverse different paths.

So, if an intermediate node has a higher delay than nodes succeeding it in the same trace, it may be assumed that most probably this is due to reasons such as congestion, de-prioritization of TTL expired response, etc. The lower the delay later in the trace, the more tightly bound the propagation delay to all the nodes traversed between the agent and the responding node, including the node with higher delay.

In instances where the non-monotonically increasing delay is large (e.g., greater than the bucket delay), it may be changed to unknown. Alternatively, if a delay's deviation from monotonicity is minor, it may simply be changed to the minimum delay succeeding it in the trace. This approach may be based on the rationale that minor variations in delay are likely caused by proximal hops and congestion.

When executed, the inter-node delay manager 406 may perform inter-node delay computation operations. These operations may be utilized to determine and/or estimate the precise delay between each pair of nodes in a traceroute. These delays can then be leveraged to create accurate buckets of nodes that are geographically proximate one another in subsequent operations.

Inter-node delay computation operations may include, for each pair of nodes, computing the delay between them as the difference between the node delays in the trace (e.g., subtracting their respective RTTs, etc.). If node delay is unknown, then the delay may be bounded between the known node delays before or after the unknown delay. If there are multiple paths between the two nodes, the minimum delay may be selected. An example application of the delay adjustment operations and/or the inter-node delay computation operations to a data set in shown in more detail in FIGS. 5A-5C.

When executed, bucketing manager 408 may perform bucketizing operations. Bucketizing operations may include grouping of nodes into clusters (e.g., buckets) whose constituents are geographically proximate one another in order to simplify the geolocation process. Here, the bucket creation may not specifically depend upon an rDNS of the nodes. Rather, buckets may encompass hops that are within the latency threshold to be considered in the same location and have consistent locations. A bucket delay threshold (e.g., 5 ms one way) may be utilized in creating the buckets.

In various implementations, performing bucketizing operations may include breaking down each trace into buckets. Given a trace, each hop of the trace may begin in its own bucket. Bucket locations may be the locations of the hops within the bucket (if any). Locations may be ordered by decreasing confidence. The highest confidence location may be the bucket colocation.

When executed, bucket validation manager 410 may perform bucket validation operations. Bucket validation operations may include operations to validate each bucket's assigned geolocation to further increase the accuracy and reliability of the geolocation data and/or prevent the propagation of errors.

Bucket validation operations may proceed by iterating through the buckets in order of decreasing confidence in their location and/or breaking ties or associations with the bucket closest starting with the bucket closest to the agent. This may include comparing a current colocation of a particular bucket with colocation of the buckets on either side of that particular bucket. If the buckets on either side of the particular bucket do not have a colocation, then a search for the next adjacent bucket that does may be continued until one is found and used as a comparison point against the particular bucket.

In various implementations, the validation operations may include validating each bucket's geolocation against fundamental physical limitations associated with the underlying communication for which the delay is measured. For example, the earlier computed delays and/or delays bounds are used in determining whether geolocations are possible according to laws of physics. Here, the delays may be the delays calculated by inter-node delay computation operations performed by inter-node delay manager 406. The delay between two buckets, A and B in trace order, may be the delay from the last node in A to the first node in B.

For instance, if in order for a delay to be accurate it would require a violation of the speed of light, then the location on the sides may be discarded. The location discarded when a speed of light violation occurs may be the one with the lower confidence characterization. Here, the speed of light may be defined as:

$$\text{speed of light} = \frac{c}{2}$$

where c=speed of light in a vacuum (186.282 miles/ms) and the value is divided by two where the measured delays are round trip delays. The new bucket colocations after discard can then become the next highest confidence location that has not been discarded. Again, these operations may be iterative and repeated from the beginning until there is no more speed of light violations.

In various implementations such a determination of whether the bucket locations are feasible or not based on speed of light observance validations may utilize the thresholds [1,10]× the speed of light to determine whether or not geolocations are feasible. These threshold are based on a finding that, in the lower bound, the RTT between two locations cannot be less than the speed of light between the two locations. However, on the upper bound, analysis revealed that RTT of up to 10× the speed of light is quite common on the Internet. Ultimately, if, by this validation, the geolocations are found to not be feasible, then the location with lower confidence may be discarded and a new bucket location may be chosen.

Recall, that buckets may initially get their locations from the single node within the bucket. The node may have several locations due to the multiple data sources. These locations may be sorted by confidence and are used in the geolocation process 248 in order of highest confidence to lowest. As buckets are merged, each of the buckets may have more than one hop with location information, possibly even with the same location information. The maximum confidence value across nodes may be used per location. The max may be used as opposed to the sum because many nodes with low confidence don't improve the confidence in that location. For example, consider a bucket where many nodes match the rDNS regex 'la'. This may simply be an artifact of an ASN's naming scheme, rather than a true indicator that the nodes are in Los Angeles. More nodes with the artifact may not necessarily increase the confidence in that designation.

When executed, merging manager 412 may perform merging operations. The merging operations may include merging the per node buckets together. This may include iterating through the links between nodes in order of increasing delay as earlier computed and/or breaking ties with the trace order. Further, the merging operations may include merging the buckets on either end of the link if the delay is within the bucket delay and/or the colocations of the buckets are the same, one or both do not have a location, and/or one colocation coves the other colocation.

When executed, fallback manager 414 may perform fallback operations. The fallback operations may include assigning colocation to buckets that heretofore do not have an assigned colocation. This may be accomplished by assigning the most common country of nodes in the bucket as the bucket location and then performing the validation operations outlined above.

Further, if the colocation of the neighboring buckets before and after the current bucket are the same, their shared colocation may be assigned to the current bucket as well. Likewise, this shared neighboring colocation assignment may be repeated utilizing the country of the neighboring buckets.

When executed, bucket assignment manager 416 may perform bucket assignment operations. The bucket assignment operations may include assigning a corresponding bucket colocation to all nodes in those buckets. That is, for each node in the bucket, a location may be assigned to it based upon the validated bucket colocation. At the end of the assignment, all nodes within a bucket may then have the same location assigned.

When executed, location consistency manager 418 may proceed to perform location consistency checks operations between traces. The location consistency check operations may include verifications of the consistency of geolocations and/or their validations across multiple traceroutes.

In addition, the location consistency check operations may include highlighting and/or making adjustments to correct any detected inconsistencies. This may ensure continued robustness and reliability of the geolocation data by cross-verification with multiple data points.

Throughout the constituent operations of geolocation process 248, approximations and heuristics are used to accommodate for limited information. This may accommodate functioning on a single trace at a time. In aggregate across different traces and rounds, far more information may be being collected, so an offline operation that builds geolocation information from all available data may achieve much higher correctness in the geolocations it generates.

For example, the same traceroute over multiple rounds has more opportunities to measure the trace delay between hops, significantly reducing the impact of measurement error and non-monotonically increasing delays. In another example, traceroutes from different agents traversing the same hop increase opportunities to invalidate incorrect geo-locations and improve confidence in correct geolocations. As such, in various implementations, geolocation process 248 may be implemented as one or more offline operations to provide a high confidence data source for geolocating trace hops.

Figure 5A:
FIGS. 5A-5C illustrate an example of an application of the delay adjustment operations and/or inter-node delay computation operations to a data set.
Figure 5A:
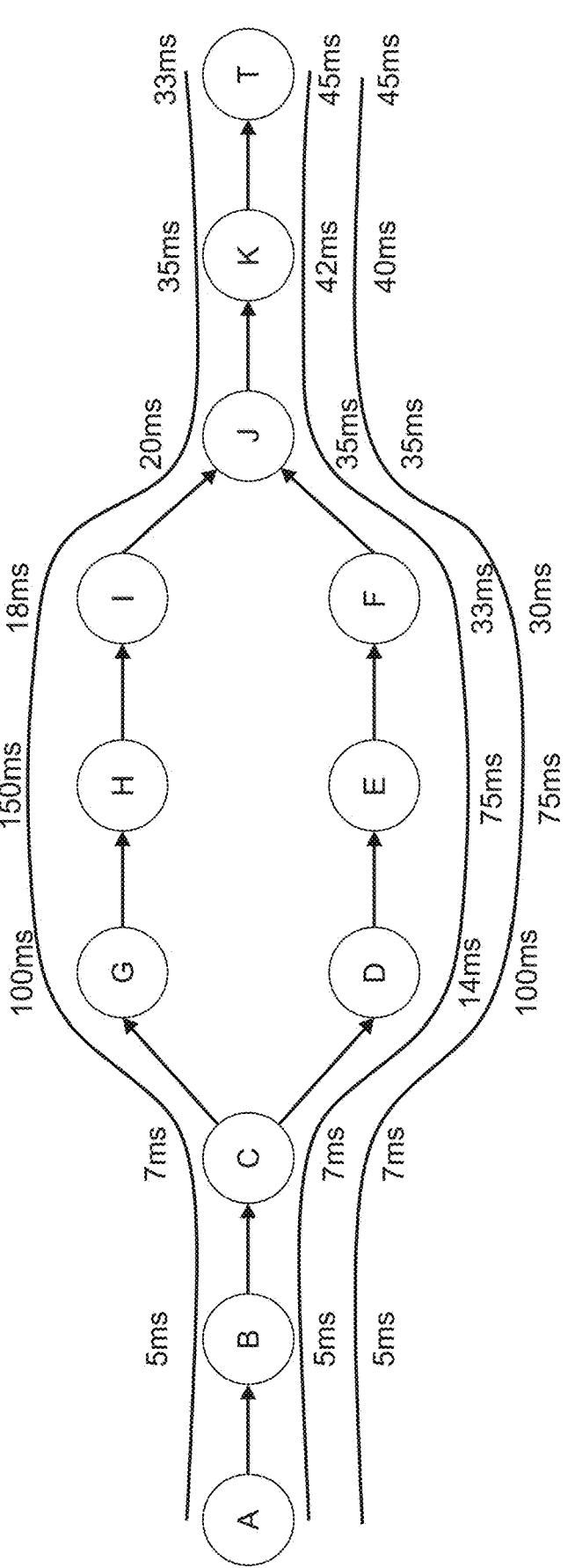
Figure 5B:
Figure 5B:
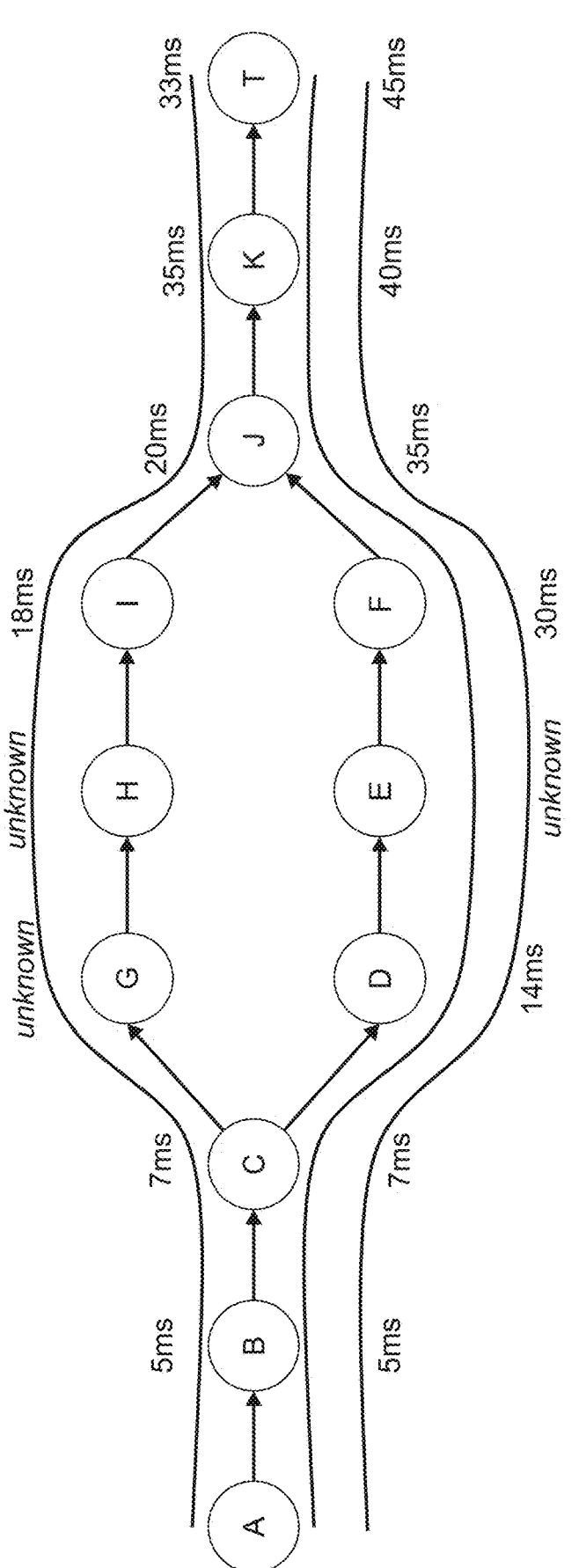
Figure 5C:
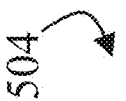

FIGS. 5A-5C illustrate an example of an application of the delay adjustment operations and/or inter-node delay computation operations to a data set, in accordance with one or more implementations described herein. Here, each TCP trace may begin with a new connection, which therefore has a different 4-tuple potentially causing it to traverse a different path.

This may be illustrated as delay path 500. Here, the three traces follow two paths that converge at the hop "J." Two traces follow the lower path and the delay measured at each hop is shown. Note that the upper path delay to the target is lower than the delay on the lower path. In previous approaches, the min delay to "J" may be calculated as 20 ms, which is inaccurate for the lower path. However, utilizing the geolocation process (e.g., geolocation process 248) described herein, this may be corrected as follows.

The minimum delay to a hop may be computed only across the traces that have the same path to that hop. After this step, the delays become: hop "B"=delay of min(5,5,5) =5, hop "C"=delay of min (7,7,7)=7, hop "D"=delay of min (14,100)=14, hop "E"=delay of min (75,75)=75, hop "F"=delay of min (32,30)=30, hop "J"-delay of 20/min (35,35)=20/35, hop "K"=delay of 35/min (42,40)=50/40, and hop "T"=delay of 33/min (45,45)=33/45. Note that the hops "J", "K", and "T" have two values as they are reachable via two paths.

Next, the non-monotonically increasing delays at nodes "G", "H", "E", and "K", identified as delays greater than the minimum delay following them along the same path, may be fixed. Because the delay to hop "K" is only slightly greater than the delay to hop "T" along the top path (e.g., less than bucket delay), the delay to hop "K" may be replaced with the delay to hop "T". Hops "G", "H", and "E" may change the hop delays to unknown. The result is revised delay path 502.

Then, the delay between pairs of nodes may be computed as the minimum difference between the minimum node delays of each node. For example, the delays between hop "C" and hop "J" are 20–7=13 and 35–7=28, and 13 is the minimum of those. For nodes with unknown delays, the delay of the closest neighboring node with a known delay to bound the delay may be utilized. The delay of node "E" is unknown, so similarly the delays of "D"→"E" and "E"→"F" is unknown. However, "D"→"F" is 16 ms, so "D"→"E"+"E"→"F"=16 ms. Thus, each one individually is no greater than 16 ms. The delays in delay chart 504 between neighboring nodes (e.g., graphically highlighted) are link delays. Note that the delays of 5 links are not precisely known but are bounded. In such an instance, the bounds may be used in subsequent operations to determine whether geolocations are possible according to speed of light.

FIG. 6 illustrates an example of a simplified procedure for confidence-based geolocation of network hops from aggre-gated multi-source data, in accordance with one or more implementations described herein. For example, a nongeneric, specifically configured device (e.g., device 200), may perform procedure 600 (e.g., a method) by executing stored instructions (e.g., geolocation process 248).

The procedure 600 may start at step 605, and continues to step 610, where, as described in greater detail above, the device (e.g., a controller, processor, etc.) may obtain geo-location data from a plurality of sources for each hop in a traceroute. Location names may be normalized across the plurality of sources. In various implementations, a proxy geolocation of a public internet protocol address may be assigned to a private network hop in the traceroute. The proxy geolocation may be utilized as the geolocation data for the private network hop in the traceroute.

At step 615, as detailed above, the device may assign a confidence characterization to each geolocation data point based on an accuracy assessment associated with its respec-tive source. The accuracy assessment may be based on available accuracy data for the source and expert knowledge. In some instances, the accuracy assessment may include a comparison of values of geolocation datapoints to particular accuracy threshold values for the corresponding source.

At step 620, the device may identify a potential geoloca-tion assignment for each hop in the traceroute based on the confidence characterization assigned to each geolocation data point and geolocations of neighboring hops in the traceroute. For example, the device may segment traceroute hops into characterization buckets of hops based on latency thresholds and geolocation consistencies. Each characteriza-tion bucket may be assigned a geolocation based on a highest confidence characterization geolocation data within it.

Characterization buckets may be merged based on related geolocation assignments shared among the buckets. In some instance, fallback geolocations may be assigned to charac-terization buckets of hops that lack an assigned geolocation. The fallback geolocation for a particular characterization bucket may be determined based on a common geolocation assignment to a characterization bucket preceding the par-ticular characterization bucket in the traceroute and a char-acterization bucket after the particular characterization bucket in the traceroute.

At step 625, the device may validate the potential geolo-cation assignment for each hop based on a comparison of communication delays between hops in the traceroute to a physical constraint. The physical constraint may be a speed of light in a vacuum. Responsive to communication delays associated with that hop violating the speed of light in the vacuum, a potential geolocation assignment for a hop may be switched to a geolocation with a next highest confidence characterization.

In various implementations, the device may enforce monotonically increasing communication delays between each hop in the traceroute by adjusting communication delays associated with a particular hop to a minimum communication delay for a hop succeeding the particular hop in the traceroute.

At step 630, the device may assign a validated potential geolocation assignment to each hop in the traceroute. Pro-cedure 600 may then end at step 635.

It should be noted that while certain steps within proce-dure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the implementations herein.

The techniques described herein, therefore, introduce a significant advancement in IP geolocation in computing networks. These techniques ensure higher accuracy and reliability compared to conventional geolocation methods. For example, by incorporating geolocation data aggregated from across multiple sources, assigning confidence scores for this data, leveraging neighboring geolocations to discover unknown locations, and/or validating geolocations through speed of light constraints, geolocation accuracy is increased, and more precise network troubleshooting and optimization is realized. Further, these techniques reduce dependency on any single, potentially inaccurate source, providing robust and consistent geolocation results. This may facilitate faster and more reliable network resolution, enhancing overall network performance and user experience.

While there have been shown and described illustrative implementations that provide for confidence-based geolocation of network hops from aggregated multi-source data, it is to be understood that various other adaptations and modifications may be made within the intent and scope of the implementations herein. In addition, while certain processes are shown, other suitable processes may be used, accordingly.

The foregoing description has been directed to specific implementations. It will be apparent, however, that other variations and modifications may be made to the described implementations, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the implementations herein. Therefore, it is the object of the appended claims to cover all such variations and modifications as come within the true spirit and scope of the implementations herein.

The invention claimed is:

1. A method, comprising:
obtaining, by a device, geolocation data from a plurality of sources for each hop in a traceroute;
assigning, by the device, a confidence characterization to each geolocation data point based on an accuracy assessment associated with its respective source;
identifying, by the device, a potential geolocation assignment for each hop in the traceroute based on the confidence characterization assigned to each geolocation data point and geolocations of neighboring hops in the traceroute;
validating, by the device, the potential geolocation assignment for each hop based on a comparison of communication delays between hops in the traceroute to a physical constraint; and
assigning, by the device, a validated potential geolocation assignment to each hop in the traceroute.

2. The method as in claim 1, wherein the physical constraint is a speed of light in a vacuum.

3. The method as in claim 2, further comprising:
switching a potential geolocation assignment for a hop to a geolocation with a next highest confidence characterization responsive to communication delays associated with that hop violating the speed of light in the vacuum.

4. The method as in claim 1, further comprising:
segmenting traceroute hops into characterization buckets of hops based on latency thresholds and geolocation consistencies.

5. The method as in claim 4, wherein each characterization bucket is assigned a geolocation based on a highest confidence characterization geolocation data within it.

6. The method as in claim 4, further comprising:
merging characterization buckets based on related geolocation assignments.

7. The method as in claim 4, further comprising:
assigning fallback geolocations to characterization buckets of hops without an assigned geolocation, wherein a fallback geolocation for a particular characterization bucket is based on a common geolocation assignment to a characterization bucket preceding the particular characterization bucket in the traceroute and a characterization bucket after the particular characterization bucket in the traceroute.

8. The method as in claim 1, wherein the geolocation data for virtual private network hop in the traceroute is a proxy geolocation of a public internet protocol address assigned to the virtual private network hop in the traceroute.

9. The method as in claim 1, further comprising:
enforcing monotonically increasing communication delays between each hop in the traceroute by adjusting communication delays associated with a particular hop to a minimum communication delay for a hop succeeding the particular hop in the traceroute.

10. The method as in claim 1, further comprising:
normalizing location names across the plurality of sources.

11. An apparatus, comprising:
one or more network interfaces;
a processor coupled to the one or more network interfaces and configured to execute one or more processes; and
a memory configured to store a process that is executable by the processor, the process when executed configured to:
obtain geolocation data from a plurality of sources for each hop in a traceroute;
assign a confidence characterization to each geolocation data point based on an accuracy assessment associated with its respective source;
identify a potential geolocation assignment for each hop in the traceroute based on the confidence characterization assigned to each geolocation data point and geolocations of neighboring hops in the traceroute;
validate the potential geolocation assignment for each hop based on a comparison of communication delays between hops in the traceroute to a physical constraint; and
assign a validated potential geolocation assignment to each hop in the traceroute.

12. The apparatus as in claim 11, wherein the physical constraint is a speed of light in a vacuum.

13. The apparatus as in claim 12, wherein the process is further configured to:
switch a potential geolocation assignment for a hop to a geolocation with a next highest confidence characterization responsive to communication delays associated with that hop violating the speed of light in the vacuum.

14. The apparatus as in claim 11, wherein the process is further configured to:
segment traceroute hops into characterization buckets of hops based on latency thresholds and geolocation consistencies.

15. The apparatus as in claim 14, wherein each characterization bucket is assigned a geolocation based on a highest confidence characterization geolocation data within it.

16. The apparatus as in claim 14, wherein the process is further configured to:

merge characterization buckets based on related geolocation assignments.

17. The apparatus as in claim 14, wherein the process is further configured to:

assign fallback geolocations to characterization buckets of hops without an assigned geolocation, wherein a fallback geolocation for a particular characterization bucket is based on a common geolocation assignment to a characterization bucket preceding the particular characterization bucket in the traceroute and a characterization bucket after the particular characterization bucket in the traceroute.

18. The apparatus as in claim 11, wherein the geolocation data for virtual private network hop in the traceroute is a proxy geolocation of a public internet protocol address assigned to the virtual private network hop in the traceroute.

19. The apparatus as in claim 11, wherein the process is further configured to:

enforce monotonically increasing communication delays between each hop in the traceroute by adjusting communication delays associated with a particular hop to a minimum communication delay for a hop succeeding the particular hop in the traceroute.

20. A tangible, non-transitory, computer-readable medium storing program instructions that cause a device to execute a process comprising:

obtaining geolocation data from a plurality of sources for each hop in a traceroute;

assigning a confidence characterization to each geolocation data point based on an accuracy assessment associated with its respective source;

identifying a potential geolocation assignment for each hop in the traceroute based on the confidence characterization assigned to each geolocation data point and geolocations of neighboring hops in the traceroute;

validating the potential geolocation assignment for each hop based on a comparison of communication delays between hops in the traceroute to a physical constraint; and assigning a validated potential geolocation assignment to each hop in the traceroute.

* * * * *